United States Patent
Jakubowski et al.

(10) Patent No.: US 11,304,400 B2
(45) Date of Patent: Apr. 19, 2022

(54) TWO STORY FOLDABLE ANIMAL LITTER CONTAINING APPARATUS

(71) Applicant: Vermont Juvenile Furniture, Mfg., Inc., West Rutland, VT (US)

(72) Inventors: Todd Jakubowski, Rutland, VT (US);
Chris Jakubowski, Rutland, VT (US);
Kristen Jakubowski, Rutland, VT (US)

(73) Assignee: Vermont Juvenile Furniture Mfg., Inc., West Rutland, VT (US)

( * ) Notice: Subject to any disclaimer, the term of this patent is extended or adjusted under 35 U.S.C. 154(b) by 251 days.

(21) Appl. No.: 16/839,375

(22) Filed: Apr. 3, 2020

(65) Prior Publication Data
US 2020/0315126 A1 Oct. 8, 2020

Related U.S. Application Data

(60) Provisional application No. 62/829,883, filed on Apr. 5, 2019.

(51) Int. Cl.
*A01K 1/01* (2006.01)

(52) U.S. Cl.
CPC .................. *A01K 1/0125* (2013.01)

(58) Field of Classification Search
CPC ...... A01K 1/033; A01K 1/035; A01K 15/024; A01K 15/027; A01K 1/0107; A01K 1/0125; A01K 1/0157; E04H 15/44
USPC ....... 119/168, 706, 499, 498, 702, 165, 474, 119/482, 485
See application file for complete search history.

(56) References Cited

U.S. PATENT DOCUMENTS

| 3,043,264 A * | 7/1962 | Felhofer | A01K 1/033 119/497 |
| 3,561,757 A * | 2/1971 | Schillig | A63B 9/00 482/35 |
| 4,286,612 A * | 9/1981 | Neal | A01K 1/033 135/115 |
| 4,347,807 A * | 9/1982 | Reich | A01K 1/033 119/499 |
| 4,803,952 A * | 2/1989 | Houser | A01K 1/033 119/499 |
| 5,050,536 A * | 9/1991 | Baker | A01K 1/035 119/499 |
| 5,092,277 A | 3/1992 | Baillie et al. | |
| 5,320,065 A * | 6/1994 | Leopold | A01K 1/035 119/498 |
| 5,423,709 A * | 6/1995 | Summers | A63H 3/52 446/108 |

(Continued)

OTHER PUBLICATIONS

Petsfit Double-Decker CatLitter Box Enclosure, Removable Durable Outer Cloth is Easy Clean, 23"×21"×35", , 7 pages, admitted prior art, retrieved Feb. 11, 2019.

(Continued)

*Primary Examiner* — Yvonne R Abbott-Lewis
(74) *Attorney, Agent, or Firm* — Volpe Koenig

(57) ABSTRACT

A Cat Litter Box System with a litter box or other indoor cat bathroom media and a collapsible, two level animal litter containing apparatus having a ground level with an enclosed bathroom area compartment and a second level with an entrance and exit compartment that is easy for a cat or other pet to access is provided. Preferably a recloseable side opening is provided on the ground level of the containing apparatus for ease of cleaning.

16 Claims, 10 Drawing Sheets

(56) References Cited

U.S. PATENT DOCUMENTS

| | | | |
|---|---|---|---|
| 5,752,470 A * | 5/1998 | Koneke | A01K 1/0125 |
| | | | 119/499 |
| 5,964,189 A * | 10/1999 | Northrop | A01K 15/024 |
| | | | 119/482 |
| 5,975,017 A * | 11/1999 | Cameron | A01K 1/033 |
| | | | 119/165 |
| 6,371,048 B1 | 4/2002 | Smith | |
| 6,431,119 B1 * | 8/2002 | Beymer | A01K 1/033 |
| | | | 119/485 |
| 6,758,167 B1 * | 7/2004 | Edelinski | A01K 1/033 |
| | | | 119/498 |
| D677,012 S | 2/2013 | Duvigneau | |
| 8,640,652 B2 * | 2/2014 | Callari | A01K 1/035 |
| | | | 119/702 |
| 9,107,383 B2 | 8/2015 | Khalili | |
| 9,326,483 B2 * | 5/2016 | Hall | A01K 1/033 |
| 10,492,463 B2 * | 12/2019 | Deraps | A01K 15/027 |
| 10,893,656 B2 * | 1/2021 | Chen | A01K 1/0157 |
| 2014/0202395 A1 * | 7/2014 | Cantwell | A01K 31/08 |
| | | | 119/474 |
| 2015/0020743 A1 | 1/2015 | Bauer et al. | |

OTHER PUBLICATIONS

Petsfit Fabric 5 Level Cat Tree for Multiple Cats, Hide Holes Inside for Climbing, admitted prior art, 7 pages admitted prior art, retrieved Feb. 11, 2019.

Lexington Circular—Obstacle Play-Active Travel Collapsible Travel Pet Cat House, 4 pages, admitted prior art, retrieved Feb. 11, 2019.

Petsfit Polyester Crate Cover for Wire Crates, admitted prior art, 2 pgs, admitted prior art, retrieved Feb. 11, 2019.

Yaheetech 4 Tier Cat Cage, Cat Playpen w/2 Front Doors & 3 Ramp Ladders & 3 Resting Platforms & Cat Bed & Locking Casters Ideal for 1-2 Cats, Cage Measures 32L×22W×48H inches, 17 pgs, admitted prior art, retrieved Feb. 11, 2019.

* cited by examiner

TWO STORY FOLDABLE ANIMAL LITTER CONTAINING APPARATUS

INCORPORATION BY REFERENCE

The following documents are incorporated herein by reference as if fully set forth: U.S. Provisional Patent Application No. 62/829,883, filed Apr. 5, 2019.

BACKGROUND

Crates, cages and other similar apparatus for housing and transporting pets are well-known in the art. These cages and crates can be rigid, or may be formed as a "soft" pet enclosure. In each case, the crate or cage is designed to contain a pet and includes sidewalls, a top, and a bottom, with one or more openable and closable doors located in the sidewalls or top.

Litter boxes for cats are also known which, in effect, are indoor bathrooms for cats. These are placed in a convenient place for cat use, which is preferably out of the way and also out of sight in the home. However, these indoor litter boxes are unsightly, can smell, and depending on the size of a pet owner's dwelling, are often in plain sight. It is also noted that some cats also are less stressed if they can relieve themselves in private.

What has also not been fully addressed is that after cats are done utilizing the litter boxes, litter, or even pet feces, can be kicked out of the litter box, or tracked through the house on the cats' paws.

The present inventors have proposed another containment system for pet litter boxes or pads. However, the footprint required was larger due to the entrance being on the ground level and having a partial serpentine path for the pet to enter and exit the litter box area so that the pet's feet could be cleaned prior to exiting the containment system by a separate mat.

SUMMARY

In one aspect, the present invention provides a Cat Litter Box System (CLBS) with a litter box or other indoor cat bathroom media and a collapsible, two level animal litter containing apparatus having a ground level with an enclosed bathroom area compartment and a second level with an entrance and exit compartment that is easy for a cat to access is provided. Preferably a recloseable side opening is provided on the ground level of the containing apparatus for ease of cleaning.

Preferably, the collapsible, two level animal litter containing apparatus, has a foldable cover with a first cover side, a second cover side, a third cover side, a fourth cover side, a cover top, and an open bottom. An entrance is defined in one of the cover sides. A foldable frame assembly supports the foldable cover. The foldable frame assembly is movable from a collapsed, stowage position to a use position and includes: a top frame having first and second sets of opposing parallel sides that are adapted to be in a horizontal plane in the use position; first and second side frames that are attached to respective ones of the first set of parallel sides of the top frame for pivoting movement about axes parallel to the first set of parallel sides of the top frame, the first and second side frames each including parallel sides, adapted to be vertical in the use position, and a bottom; cross member sections pivotally connected to each of the parallel sides of the first and second side frames at a medial location, the cross member sections being pivotable from a position adjacent to a respective one of the parallel sides of the first and second side frames in the collapsed position toward an opposite one of the first and second side frames into a horizontal orientation in the use position with free ends of opposing ones of the cross member sections being connected to one another to form medial cross members that extend between the first and second side frames in the use position; and bottom member sections pivotally connected to each of the parallel sides of the first and second side frames at a bottom location, the bottom member sections being pivotable from a position adjacent to a respective one of the parallel sides of the first and second side frames in the collapsed position toward an opposite one of the first and second side frames into a horizontal orientation in the use position, with free ends of opposing ones of the bottom member sections being connected to one another to form bottom cross members that extend between the first and second side frames in the use position to form a bottom of the foldable frame assembly. A medial divider, preferably formed of a mesh material, is connected to the medial cross members. This medial divider extends horizontally in the use position. The foldable frame supports the foldable cover. The medial divider defines upper and lower compartments within the foldable cover in the use position and an internal pet opening between the two internal compartments. The entrance is defined in the one of the cover sides and leads into the upper compartment.

In one arrangement, the medial divider is removably attached to at least one of the at least two medial cross members.

Preferably, the first and second side frames are wire frames and at least one of the first or second side frames includes an intermediate frame member arranged at a level of the medial cross members, and the medial divider is attached to the intermediate frame member in the use position.

Preferably, all of the frame members are formed of wire.

In one arrangement, the medial divider is attached to the medial cross members using at least one of sleeves that slide over the medial cross members or a hook and loop textile fastener flaps that engage over the medial cross members, and the medial divider is also attached to the intermediate frame member using a hook and loop textile fastener flap.

The medial divider preferably extends partially across a distance between the first and second side frames in the use position to define the internal pet opening.

The internal pet opening is opposite to the entrance in the foldable cover. This forces the pet to walk across the mesh material of the medial divider upon exiting the litter box to dislodge any media or feces, which can fall back into the litter box. A litter box, which can be provided with or separately from the collapsible, two level animal litter containing apparatus as part of the CLBS, is located in the lower compartment.

In one arrangement, a zippered panel is located in at least one of the first cover side, the second cover side, the third cover side, or the fourth cover side.

Preferably, the foldable cover is attachable to the foldable frame assembly.

In one arrangement, the foldable cover has a mesh portion.

In one arrangement, the collapsible, two level animal litter containing apparatus is foldable with the free ends of the cross member sections being disconnected and the free ends of the bottom member sections being disconnected and with the foldable cover attached to the foldable frame.

In another aspect, a method of assembling the collapsible, two level animal litter containing apparatus as described above is provided and includes: pivoting the first and second side frames from a position adjacent to the top frame to a position normal to the top frame by pivoting the first and second side frames about the axes parallel to the first set of parallel sides of the top frame; pivoting the cross members sections attached to the first and second side frames toward one another and connecting the free ends of the opposing ones of the cross member sections to one another to form the medial cross members that extend between the first and second side frames; attaching the medial divider, preferably formed of the mesh material, to the medial cross members; pivoting the bottom members sections attached to the first and second side frames toward one another and connecting the free ends of the opposing ones of the bottom member sections to one another to form the bottom cross members that extend between the first and second side frames.

Preferably, the method further includes installing the foldable cover on the frame assembly.

In one arrangement, the medial divider includes sleeves on opposite sides, and the method further includes sliding the sleeves onto the cross members sections that are attached to the first side frame prior to connecting the free ends of the opposing ones of the cross member sections to the cross members sections that are attached to the first side frame.

Preferably, a hook-and-loop textile fastener flap is provided on the medial divider on a side that extends between the sleeves, and the first side frame includes an intermediate frame member arranged at a level of the medial cross members in the use position, and the method further comprises attaching the medial divider to the intermediate frame member using the hook-and-loop textile fastener flap.

One or more above aspects may be used individually or in combination with other ones of the described features.

BRIEF DESCRIPTION OF THE DRAWINGS

The foregoing summary, as well as the following detailed description of the preferred embodiments of the invention will be better understood when read in conjunction with the appended drawings. For the purpose of illustrating the invention, there is shown in the drawings embodiments which are presently preferred. It should be understood, however, that the invention is not limited to the precise arrangement shown.

DETAILED DESCRIPTION

Figure 1:
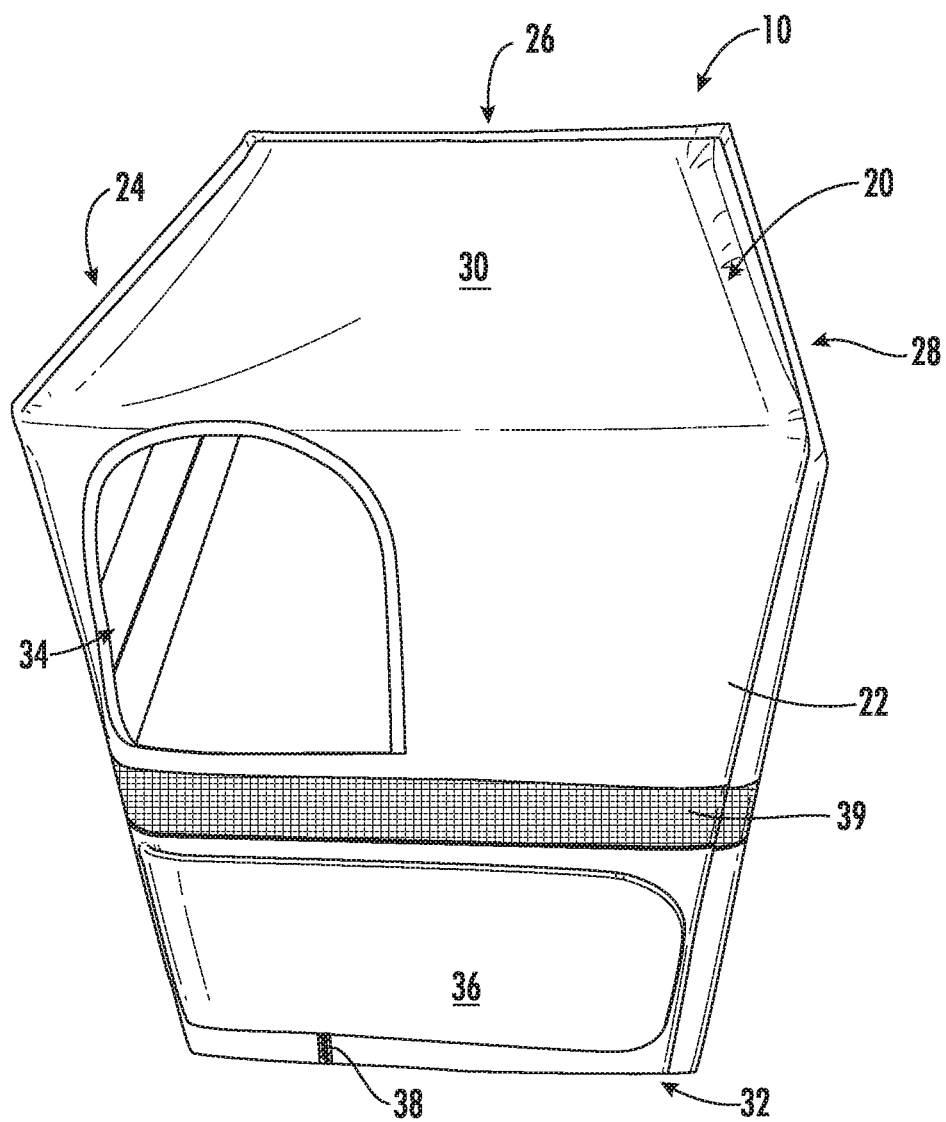
FIG. 1 is a top front perspective view of a collapsible, two level animal litter containment apparatus used as part of a CLBS in accordance with one embodiment.
Figure 2:
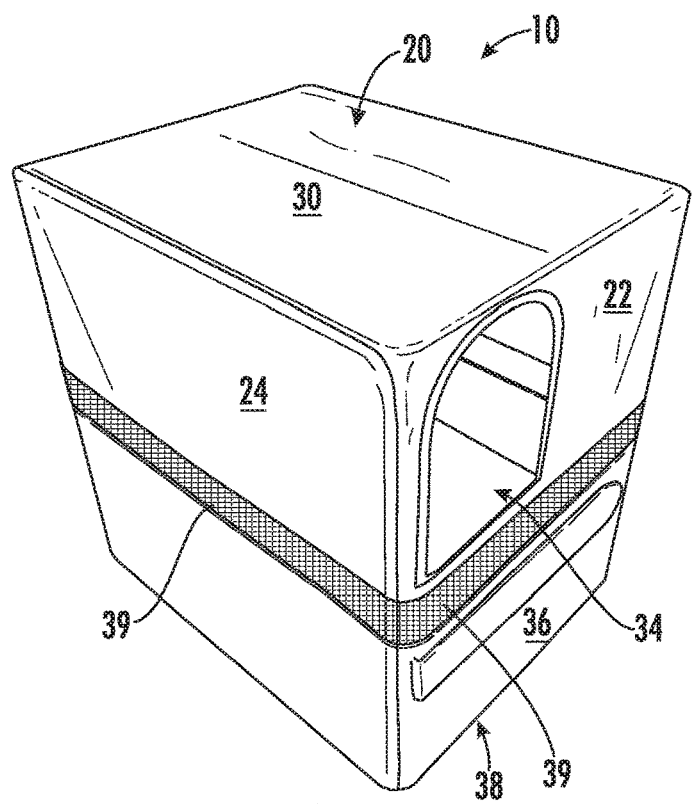
FIG. 2 is a top, front, left perspective view of the collapsible, two level animal litter containment apparatus of FIG. 1.
Figure 3:
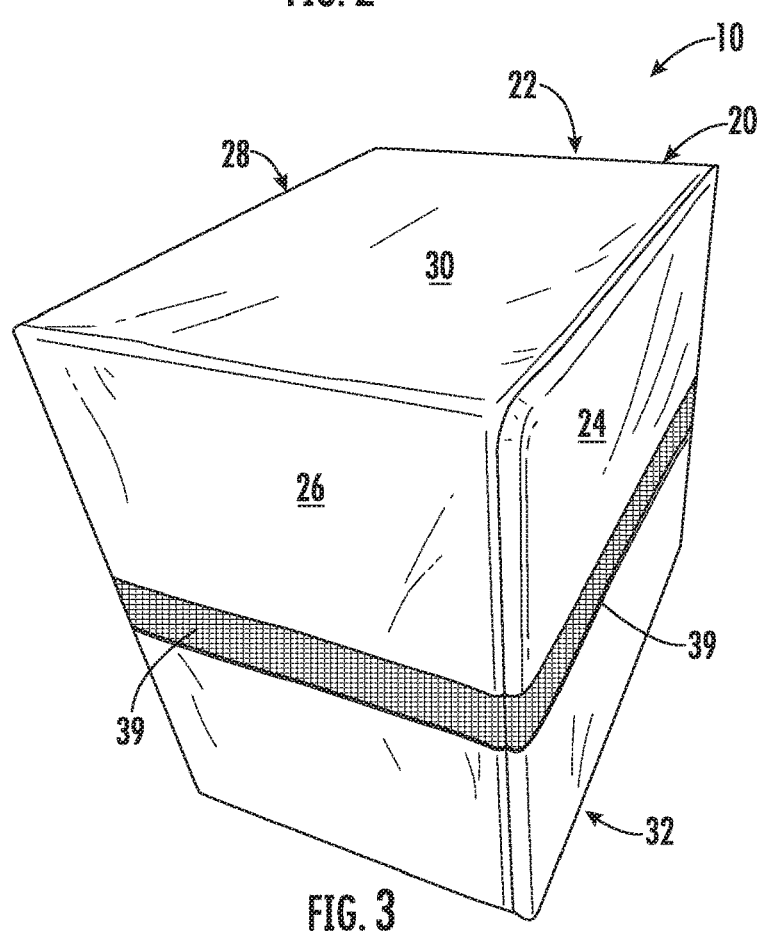
FIG. 3 is a back, top, left perspective view of the collapsible, two level animal litter containment apparatus of FIG. 1.

For purposes of this detailed description, words such as "front," "back," "top," "bottom," "left," and "right" designate directions in the drawings, and are used for convenience in referring to the designated parts or areas. The use of the terminology "at least one of" followed by a list of elements, such as "A, B, or C," means A, B, or C individually or various combinations thereof.

Figure 4:
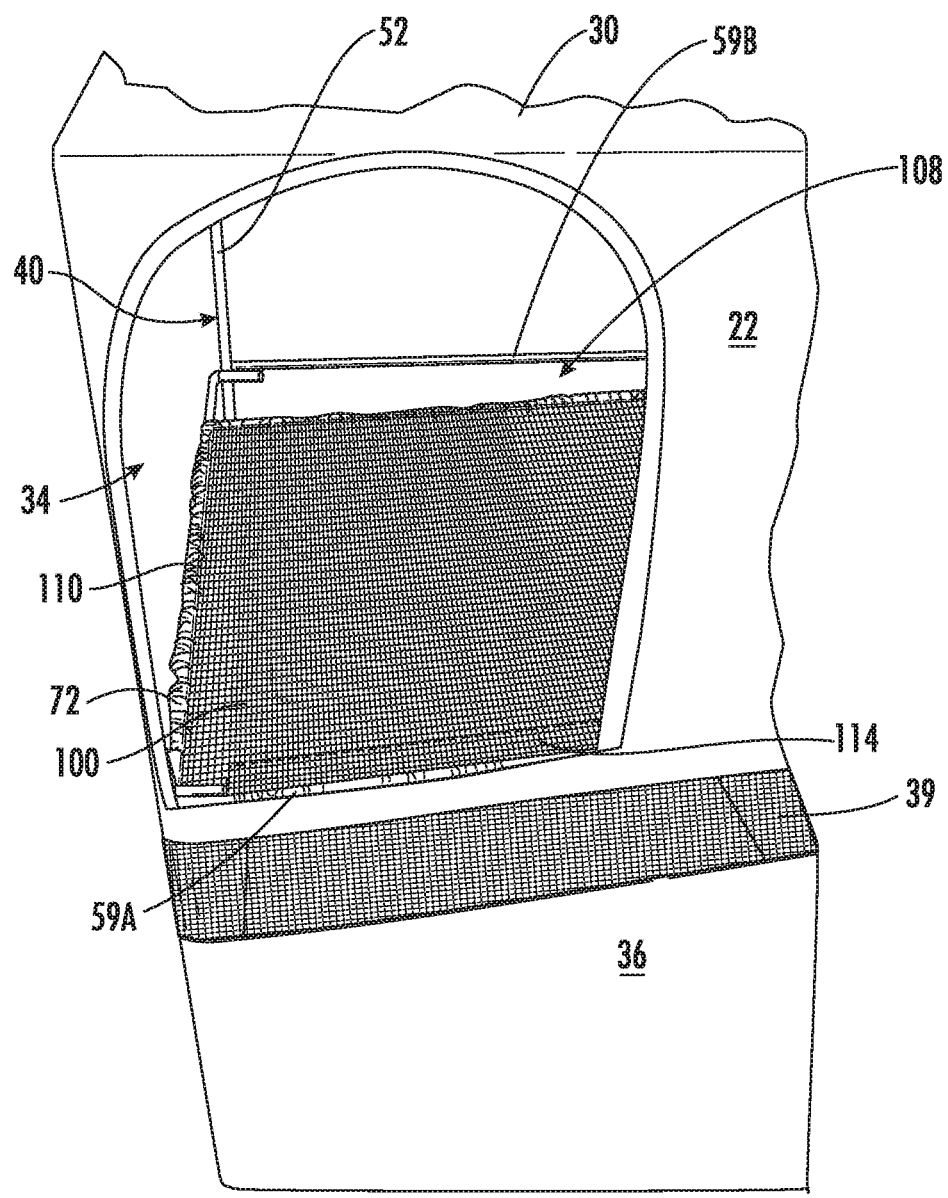
FIG. 4 is an enlarged detail showing the entrance in a front defined by a first cover side of the collapsible, two level animal litter containment apparatus shown in FIG. 1.
Figure 5:
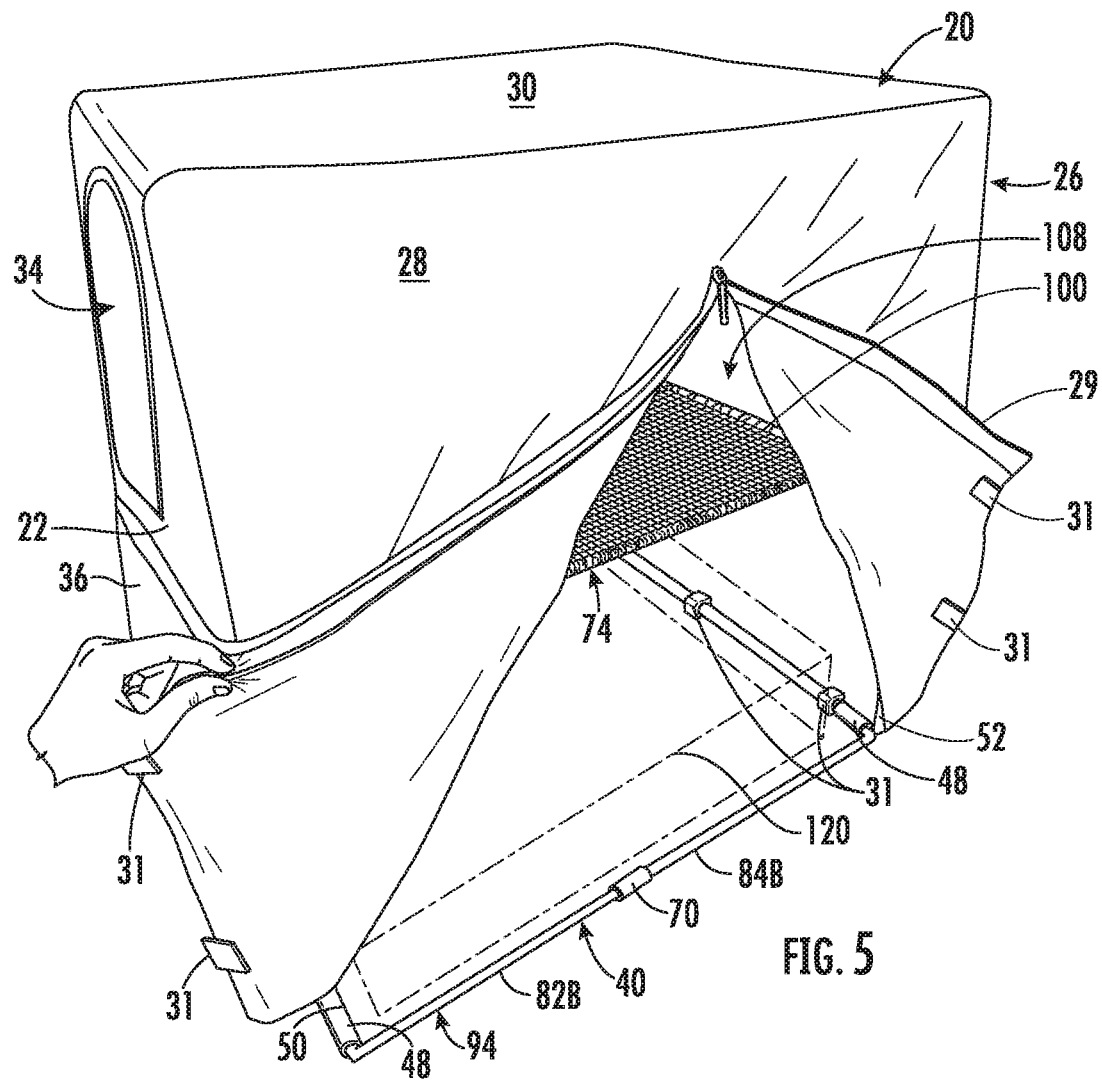
FIG. 5 is a side view of the collapsible, two level animal litter containment apparatus showing an openable side cover, shown partially open.
Figure 8:
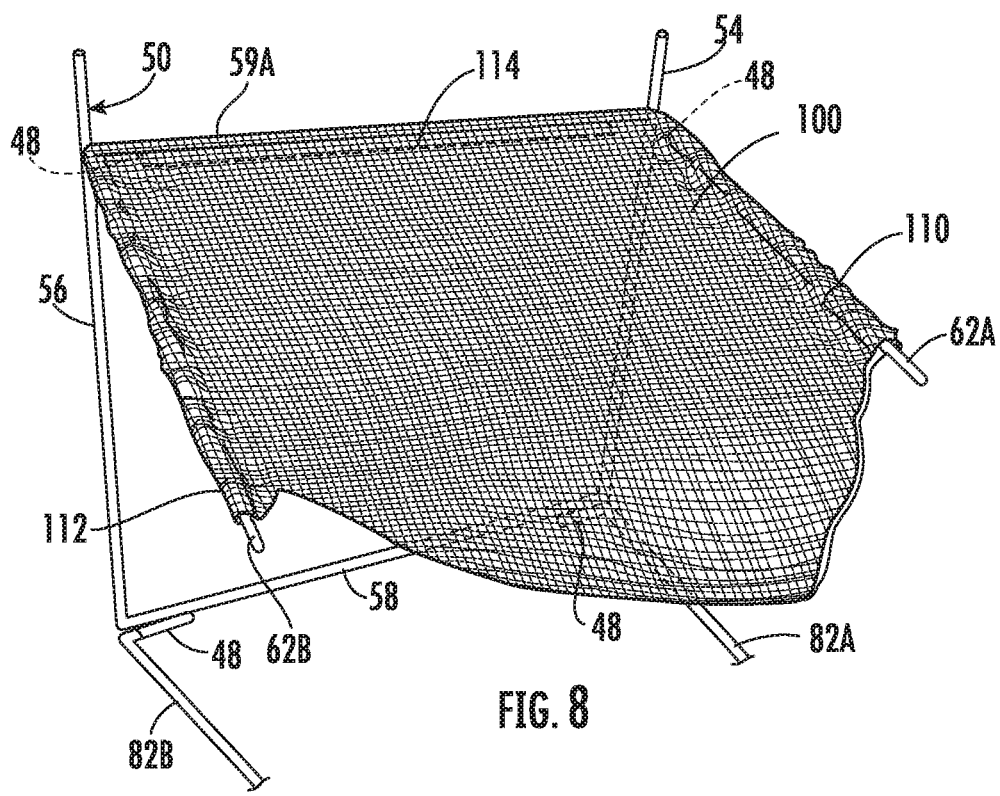
FIG. 8 is a partial view showing the medial divider being installed on cross member sections of the medial cross members.
Figure 9:
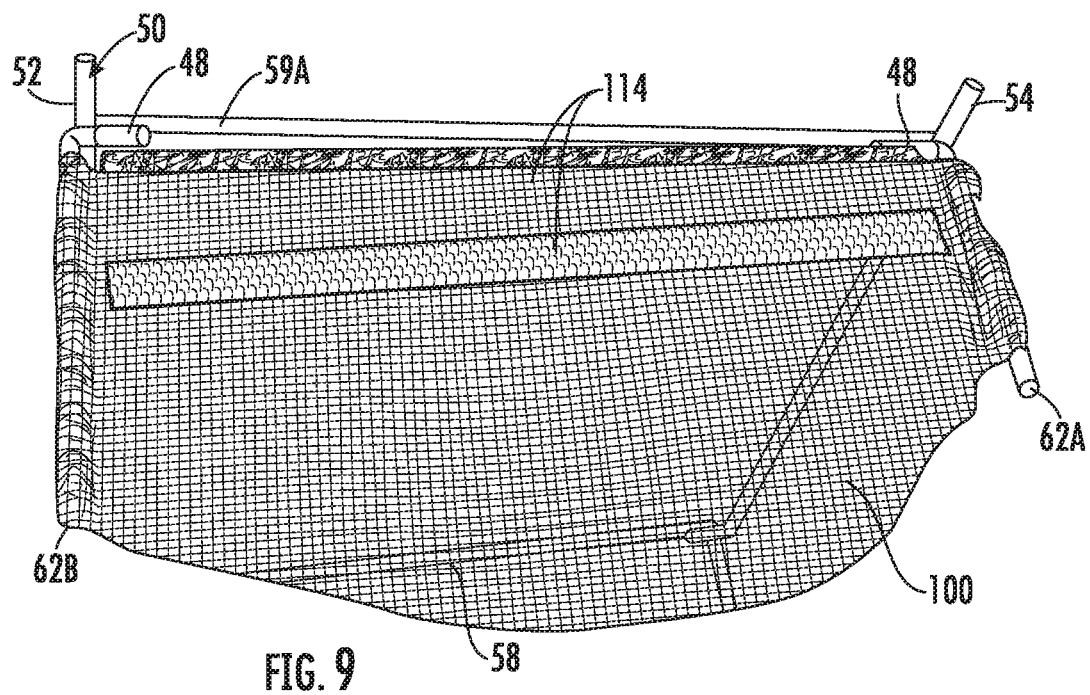
FIG. 9 is a partial view similar to FIG. 8 showing the side of the medial divider that extends between the cross members being attached to the intermediate frame member using a hook and loop textile fastener flap.
Figure 12:
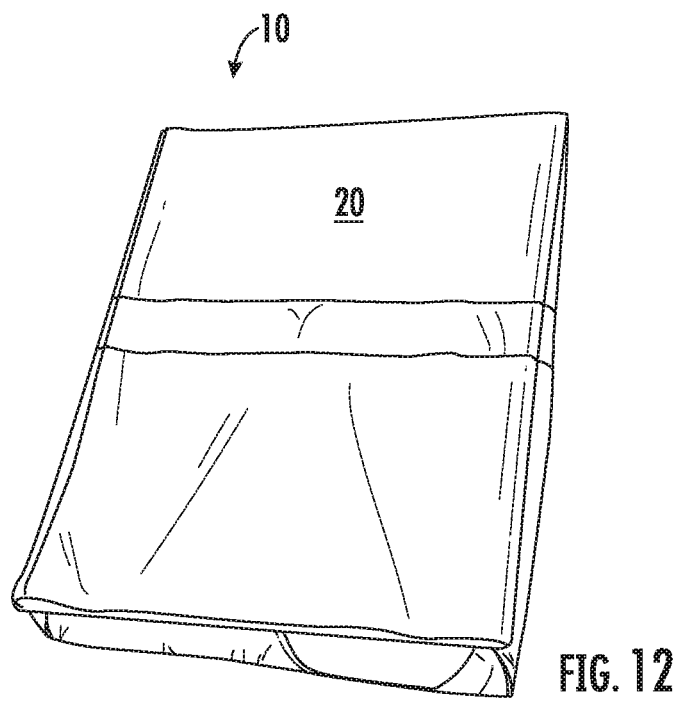
FIG. 12 is a top, front view showing the collapsible, two level animal litter containment apparatus, including the foldable frame assembly and the foldable cover shown in a collapsed, stowage position.
Figure 13:
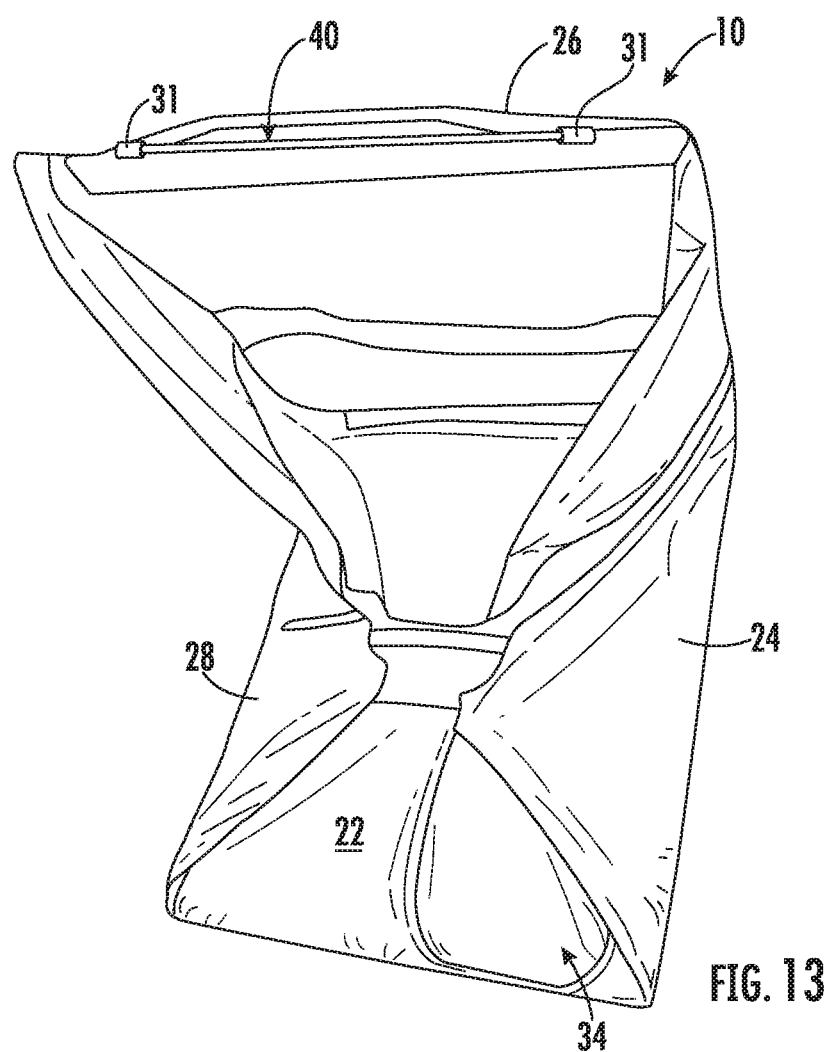
FIG. 13 is a perspective view showing the collapsible, two level animal litter containment apparatus, including the foldable cover and the foldable frame assembly being partially opened toward the use position.
Figure 14:
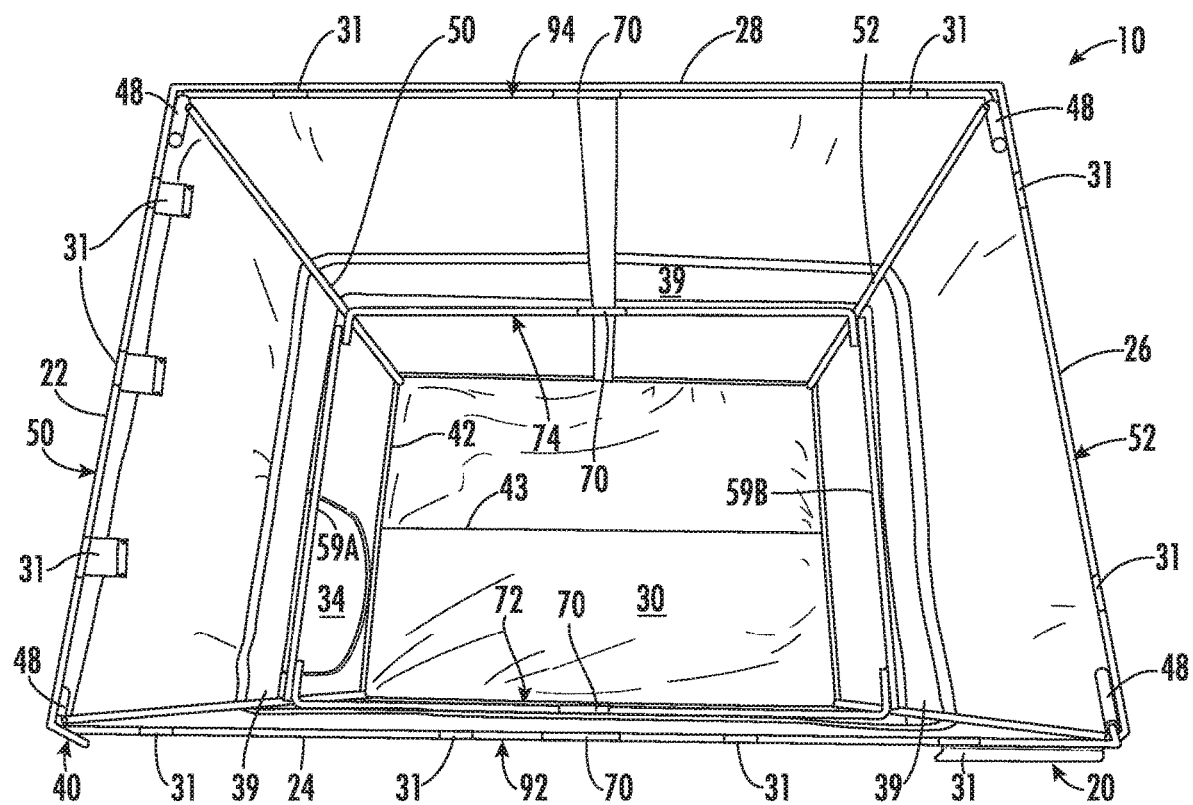
FIG. 14 is a bottom view showing the foldable frame assembly with the foldable cover attached, inverted from the use position, that shows the inside of the collapsible, two level animal litter containing apparatus.

Referring to FIGS. 1-5, a collapsible, two level animal litter containment apparatus 10 which forms part of a CLBS when a litter box, indicated as 120 in FIG. 5 is installed, is shown in detail. A foldable cover 20 of the collapsible, two level animal litter containment apparatus 10 is shown clearly in these views while a foldable frame assembly 40 of the collapsible, two level animal litter containment apparatus 10 is shown in detail without the foldable cover 20 in FIGS. 6, 7, 10, and 11. FIGS. 8 and 9 show part of the assembly process for the collapsible, two level animal litter container 10, while FIGS. 12-14 show the collapsible, two level animal litter containing apparatus 10 being unfolded from a collapsed, stowage position to an open, use position.

As shown in FIGS. 1-5, the foldable cover 20 has a first cover side 22, a second cover side 24, a third cover side 26, a fourth cover side 28, and a cover top 30. These can be formed of cloth, canvas or a polymeric material, and are sewn or otherwise attached together in a basic rectilinear form. The foldable cover 20 has an open bottom 32, and preferably an entrance 34 is defined in one of the cover sides, preferably the first cover side 22 which is also referred to as the front cover side 22. The foldable cover material is preferably waterproof or includes a water proof coating. Further, one or more mesh portions 39 can be provided on one or more of the first, second, third, and fourth cover sides 22, 24, 26, and 28, as shown.

As shown in FIG. 1, a zippered panel 36 is preferably located in at least one of the first cover side, second cover side, third cover side, or the fourth cover side 22, 24, 26, 28, and is preferably in the first or front cover side 22 for ease of access. The zippered panel 36 can be opened via the zipper 38 in order to allow access to the litter box 120 for changing.

As shown in detail in FIG. 5, one of the second, third, or fourth cover sides 24, 26, 28 can optionally include a zipper 29 to allow for easier placement of the foldable cover 20 onto the foldable frame assembly 40.

Additionally, as shown in FIG. 5 as well as in FIG. 14, straps 31 can be provided along the bottom edges of the first, second, third, and fourth cover sides 22, 24, 26, 28 in order to removably attach the foldable cover 20 to the foldable frame assembly 40. These straps 31 can be positioned as needed and may be formed from or with any suitable fastener, such as a hook-and-loop textile fastener, for example VELCRO®, cloth straps with snaps, or other suitable attachment.

Figure 6:
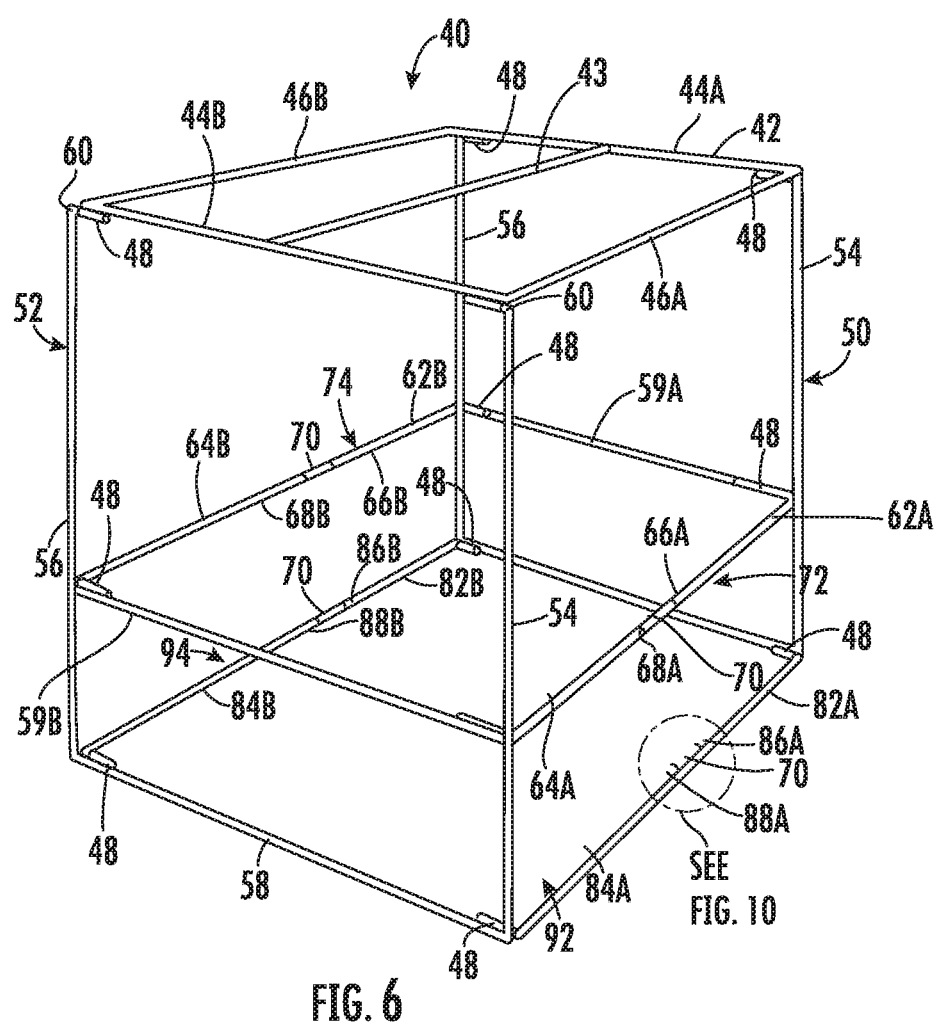
FIG. 6 is a view of the foldable frame assembly used for the collapsible, two level animal litter containment apparatus shown in FIG. 1.

Referring now to FIGS. 6-11, the foldable frame assembly 40 will be described in detail. The foldable frame assembly 40 supports the foldable cover 20 and is movable from a collapsed, stowage position to an opened, use position. As shown in detail in FIGS. 6 and 7, the foldable frame assembly 40 includes a top frame 42 having first and second sets of opposing parallel sides 44A, 44B; 46A, 46B. These sides 44A, 44B; 46A, 46B are adapted to be in a horizontal plane in the use position and define the top of the foldable frame assembly 40. Preferably, the top frame 42 is formed as a wire frame, and the opposing parallel sides 44A, 44B; 46A, 46B are joined at the corners to form an open frame. The top frame 42 can include an optional cross member 43 as shown in FIG. 6. Additionally, hinge barrels 48 are located at the corners, preferably on the first set of opposing parallel sides 44A, 44B which are used for connecting the side frames 50 and 52, as discussed below.

Figure 7:
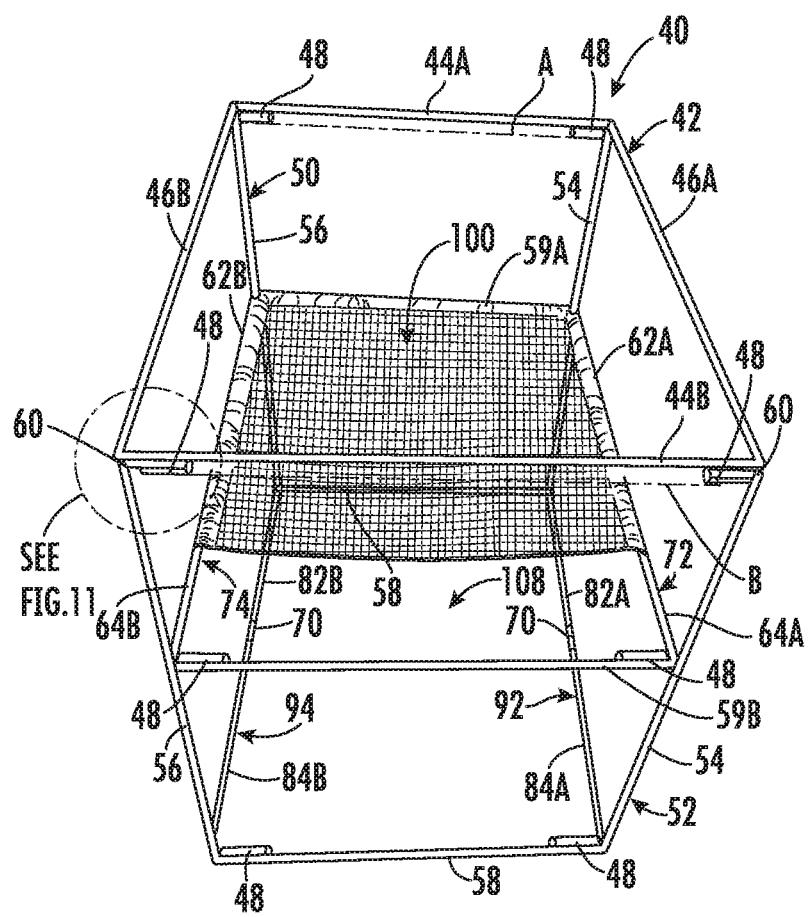
FIG. 7 is a view of the foldable frame assembly similar to FIG. 6 showing the medial divider connected between the medial cross members.

Still with reference to FIGS. 6 and 7, first and second side frames 50, 52 are attached to the top frame 42 for pivoting movement about respective axes A, B parallel to the first set of parallel sides 44A, 44B of the top frame 42. The first and second side frames 50, 52 each include parallel sides 54, 56, adapted to be vertical in the use position, and a bottom 58. The top ends of the parallel sides 54, 56 include a bent section 60 that acts as a hinge pin that extends into the respective hinge barrels 48 in order to allow pivoting movement of the first and second side frames 50, 52 relative to the respective one of the first set of parallel sides 44A, 44B, as shown in detail in FIG. 11. These first and second side frames 50, 52 are preferably made of bent up wire. Preferably, at least one of the first and second sides 50, 52 includes an intermediate frame member 59A, 59B arranged at a level of the medial cross members 72, 74, discussed below. Additional hinge barrels 48 are preferably also mounted on these medial frame members 59A, 59B as well as at the bottoms 58.

Still with reference to FIGS. 6 and 7, cross member sections 62A, 62B; 64A, 64B are pivotably connected to respective ones of the parallel sides 54, 56 of each of the respective first and second side frames 50, 52 at the medial location. The cross member sections 62A, 62B; 64A, 64B are pivotable from a position adjacent to a respective one of the parallel sides 54, 56 of the first and second side frames 50, 52 in the collapsed position toward an opposite one of the first and second side frames 50, 52 into a horizontal orientation in the use position, with free ends 66A, 66B; 68A, 68B of opposing ones of the cross member sections 62A, 64A; 62A, 64B being connected to one another, preferably using connector sleeves 70, shown in detail in FIG. 10. Once connected, these cross member sections 62A, 64A; 62B, 64B form respective medial cross members 72, 74 that extend between the first and second side frames 50, 52 in the use position.

Figure 11:
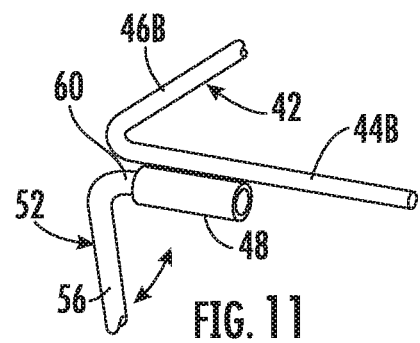
FIG. 11 is an enlarged detail taken from the indicated area in FIG. 7.

These cross member sections 62A, 62B; 64A, 64B are preferably formed of wire and include bent ends that are engaged in the hinge barrels 48 at the medial position at the parallel sides 54, 56 of the side frame members 50, 52 in order to form the pivoting connections in a similar manner to the connection shown in FIG. 11.

Still with reference to FIGS. 6 and 7, bottom member sections 82A, 82B; 84A, 84B are pivotably connected to each of the parallel sides 54, 56 of the respective first and second side frames 50, 52 at the bottom location. The bottom member sections 82A, 82B; 84A, 84B are pivotable from a position adjacent to a respective one of the parallel sides 54, 56 of each of the respective first and second side frames 50, 52 in the collapsed, stowage position, toward an opposite one of the first and second frames 50, 52 to a horizontal orientation in the use position, with free ends 86A, 86*b*; 88A, 88B of opposition ones of the bottom section 82A, 84A; 82B, 84B; being connected to one another, preferably via connector sleeve 70, to form bottom cross members 92, 94 that extend between the first and second side frames 50, 52 in the use position to form a bottom of the foldable frame assembly 40. The bottom member sections 82A, 82B; 84A, 84B preferably include bent ends that engage in the hinge barrels 48 located on the bottoms 58 of the respective first and second side frames 50, 52 in order to form the pivotable connection is a similar manner to the connection shown in FIG. 11. These bottom member sections 82A, 82B; 84A, 84B are preferably also formed of wire. The connector sleeves 70 are slidable along the bottom member sections 82A, 82B at least a sufficient distance to engage the free end of the opposing one of the bottom member sections 84A, 84B in order to form the bottom cross members 92, 94, once assembled. See FIG. 10.

Referring to FIGS. 7, 8, 9, a medial divider 100 is connected to the medial cross members 72, 74. The medial divider 100 is formed of a suitable flexible material, which can be cloth, canvas, or a suitable polymeric material. Preferably, the medial divider is formed of a mesh material 102. The medial divider 100 extends horizontally in the use position as shown in FIG. 7. The medial divider 100 can also be seen in FIGS. 4 and 5 inside of the foldable cover 20 that is supported on the foldable frame assembly 40. The medial divider 100 defines upper and lower compartments 104, 106 within the foldable cover 20 in the use position and also defines an internal pet opening 108, shown in detail in FIGS. 4 and 5 between the two internal compartments 104, 106. The entrance 34 in the foldable cover 20 is defined in the front cover side 22 of the foldable cover 20 and leads into the upper compartment 104.

Referring to FIGS. 8 and 9, the medial divider 100 is preferably removably attached to at least one of the two medial cross members 72, 74. As shown in FIG. 9, this attachment is preferably made using a hook-and-loop textile fastener flap 114 which can be wrapped around the medial frame member 79A and then connected to itself. This can be, for example, made from two VELCRO® strips. This anchors the medial divider 100 adjacent to the first or front cover side 22 that includes the entrance 34. The medial divider 100 is also attached to the medial cross members 72, 74, preferably using sleeves 110, 112 formed in the material of the medial divider 100 along two opposing sides. As shown in FIGS. 8 and 9, these sleeves 100, 112 slide over cross member sections 62A, 62B of the medial cross members 72, 74. Alternatively, other types of connections could be used, such as a hook-and-loop textile fastener flap and engages over the medial cross members 72, 74 in a similar manner to the hook-and-loop textile fastener flap 114 shown in FIG. 9 that is used to connect to the intermediate frame member 79A. This would allow installation of the medial divider after the medial cross members 72, 74 are assembled.

As best seen in FIGS. 4 and 5, the medial divider 100 extends only partially across a distance between the first and second side frames 50, 52 in the use position in order to define the internal pet opening 108. The internal pet opening 108 is located opposite to the entrance 34 in the foldable cover 20 so that the pet is forced to walk across the mesh material 102 of the medial divider after it enters the entrance 34, and then can drop down through the internal pet opening 108 to the litter box 120, schematically illustrated in FIG. 5, in the lower compartment 106. Once the pet is finished using the litter box 120, it climbs back through the internal pet opening 108 onto the medial divider 100 and must walk across this to exit back through the entrance 34. Here, the mesh material 102 of the medial divider 100 brushes the litter from the pet's feet and allows it to fall back into the litter box 120 through the mesh openings.

As shown in detail in FIG. 14, preferably the foldable cover 20 is attached to the bottom cross members 92, 94 of the foldable frame assembly 40 using hook-and-loop textile fastening straps 31. This allows for easier removal or partial disassembly of the foldable cover 20 from the foldable frame assembly 40 in order to allow for cleaning.

In order to fold the collapsible, two level animal litter containing apparatus 10, the free ends 66A, 66B of the cross member sections 62A, 62B are disconnected from the free ends 68A, 68B of the cross member sections 64A, 64B, preferably by disconnecting the connector sleeves 70, which allows the cross member sections 62A, 62B to fold down. To the extent that the medial divider 100 is connected to the cross member sections 64A, 64B via the sleeves 110, 112, these are slid off of the cross member sections 64A, 64B in order to allow the cross member sections 62A, 62B to be folded down along the first side frame 50. The free ends 86A, 86B of the bottom member sections 82A, 82B are also disconnected from the free ends 88A, 88B of the bottom member sections 84A, 84B, preferably by disconnecting the connector sleeves 70. This allows the bottom member sections 82A, 82B; 84A, 84B to be folded toward the respective ones of the first and second side frames 50, 52 as the side frames 50, 52 are moved toward one another. It is noted that the fastening straps 31 connecting the foldable cover 20 to the bottom member sections 82A, 82B; 84A, 84B will have to be disconnected prior to folding in order to allow the foldable cover 20 to fold down and into itself as the first side frame 50 and the second side frame 52 are consecutively folded downwardly such that the collapsible, two level animal litter containing apparatus 10 can be folded relatively flat as shown in FIG. 12. This folding process is reversed as shown in FIG. 13 in order to re-erect the collapsible, two level animal litter containing apparatus 10.

A method of assembling the collapsible, two level animal litter containing apparatus 10 is now described.

Figure 10:
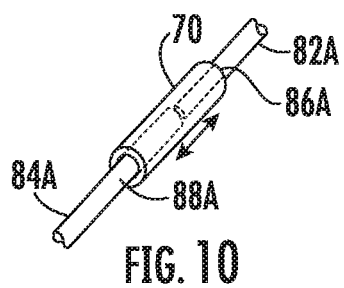
FIG. 10 is an enlarged detail taken from the indicated area in FIG. 6.

With the collapsible, two level animal litter containing apparatus 10 in the inverted position, as shown in FIG. 10, the first and second side frames 50, 52 with the attached foldable cover 20 are pivoted from a position adjacent to the top frame 42 to a position normal to the top frame by pivoting the first and second side frames 50, 52 about axes A, B parallel to the first set of parallel sides 44A, 44B of the top frame 42. The cross member sections 62A, 62B; 64A, 64B attached to the respective first and second side frames 50, 52, are pivoted toward one another and the free ends 66A, 66B; 68A, 68B of opposing ones of the cross member sections 62A, 62B; 64A, 64B are connected to one another, preferably using 6he connector sleeves 70, to form the medial cross members 72, 74 that extend between the first and second side frames 50, 52. The medial divider 100 is attached to the medial cross members 72, 74, preferably by sliding the sleeves 110, 112 over the medial cross members 72, 74 or, to the extent that the medial divider 100 was previously installed, sliding them back across the connector sleeve 70 onto the cross member sections 64A, 64B that are pivotably connected to the second side frame 52.

The bottom member sections 82A, 82B; 84A, 84B attached to the respective first and second side frames 50, 52 are pivoted toward one another and the free ends 86A, 86B; 88A, 88B of opposing ones of the bottom member sections 82A, 82B; 84A, 84B are connected to one another, preferably using the connector sleeves 70, to form the bottom cross members 92, 94 that extend between the first and second side frames 50, 52. At this point, to the extent that any of the straps 31 need to be reconnected from the foldable cover 20 to the foldable frame assembly 40, these can be reattached.

If not already connected, the hook-and-loop textile fastener flap 114 on the medial divider 100 is connected to the intermediate frame member 79A.

Having thus described in detail a preferred selection of embodiments of the present invention, it is to be appreciated and will be apparent to those skilled in the art that many physical changes could be made to the foldable animal litter containing apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A collapsible, two level animal litter containing apparatus, comprising:
   a foldable cover having a first cover side, a second cover side, a third cover side, a fourth cover side, a cover top, and an open bottom, with an entrance defined in one of the cover sides;
   a foldable frame assembly that supports the foldable cover, the foldable frame assembly is movable from a collapsed position to a use position and includes:
      a top frame having first and second sets of opposing parallel sides that are adapted to be in a horizontal plane in the use position;
      first and second side frames, attached to the top frame for pivoting movement about axes parallel to the first set of parallel sides of the top frame, the first and second side frames each including parallel sides, adapted to be vertical in the use position, and a bottom;
      cross member sections pivotally connected to each of the parallel sides of the first and second side frames at a medial location, the cross member sections being pivotable from a position adjacent to a respective one of the parallel sides of the first and second side frames in the collapsed position toward an opposite one of the first and second side frames to a horizontal orientation in the use position with free ends of opposing ones of the cross member sections being connected to one another to form medial cross members that extend between the first and second side frames in the use position;

bottom member sections pivotally connected to each of the parallel sides of the first and second side frames at a bottom location, the bottom member sections being pivotable from a position adjacent to a respective one of the parallel sides of the first and second side frames in the collapsed position toward an opposite one of the first and second side frames to a horizontal orientation in the use position, with free ends of opposing ones of the bottom member sections being connected to one another to form bottom cross members that extend between the first and second side frames in the use position to form a bottom of the foldable frame assembly;

a medial divider connected to the medial cross members, the medial divider extends horizontally in the use position;

the foldable frame assembly supports the foldable cover;

the medial divider defines upper and lower compartments within the foldable cover in the use position and an internal pet opening between the two internal compartments; and the entrance is defined in the one of the cover sides into the upper compartment.

2. The apparatus of claim 1, wherein the medial divider is removably attached to at least one of the at least two medial cross members.

3. The apparatus of claim 2, wherein the first and second side frames are wire frames and at least one of the first or second side frames includes an intermediate frame member arranged at a level of the medial cross members, and the medial divider is attached to the intermediate frame member in the use position.

4. The apparatus of claim 3, wherein the medial divider is attached to the medial cross members using at least one of sleeves that slide over the medial cross members or a hook and loop textile fastener flaps that engage over the medial cross members, and is attached to the intermediate frame member using a hook and loop textile fastener flap.

5. The apparatus of claim 1, wherein the medial divider extends partially across a distance between the first and second side frames in the use position to define the internal pet opening.

6. The apparatus of claim 5, wherein the internal pet opening is opposite to the entrance in the foldable cover.

7. The apparatus of claim 1, wherein the medial divider is formed of a mesh material.

8. A cat litter box system comprising the apparatus of claim 1 and a litter box located in the lower compartment.

9. The apparatus of claim 1, further comprising a zippered panel located in at least one of the first cover side, the second cover side, the third cover side, or the fourth cover side.

10. The apparatus of claim 1, wherein the foldable cover is attachable to the foldable frame assembly.

11. The apparatus of claim 1, wherein the foldable cover has a mesh portion.

12. The collapsible, two level animal litter containing apparatus of claim 1, wherein the collapsible, two level animal litter containing apparatus is foldable with the free ends of the cross member sections being unconnected and the free ends of the bottom member sections being disconnected with the foldable cover attached to the foldable frame.

13. A method of assembling the collapsible, two level animal litter containing apparatus of claim 1, the method comprising:

pivoting the first and second side frames from a position adjacent to the top frame to a position normal to the top frame by pivoting the first and second side frames about the axes parallel to the first set of parallel sides of the top frame;

pivoting the cross member sections attached to the first and second side frames toward one another and connecting the free ends of the opposing ones of the cross member sections to one another to form the medial cross members that extend between the first and second side frames;

attaching the medial divider to the medial cross members;

pivoting the bottom member sections attached to the first and second side frames toward one another and connecting the free ends of the opposing ones of the bottom member sections to one another to form the bottom cross members that extend between the first and second side frames.

14. The method of claim 13, further comprising installing the foldable cover on the frame assembly.

15. The method of claim 13, wherein the medial divider includes sleeves on opposite sides, and the method further includes sliding the sleeves onto the cross members sections that are attached to the first side frame prior to connecting the free ends of the opposing ones of the cross member sections to the cross members sections that are attached to the first side frame.

16. The method of claim 15, wherein a hook-and-loop textile fastener flap is provided on the medial divider on a side that extends between the sleeves, and the first side frame includes an intermediate frame member arranged at a level of the medial cross members in the use position, and the method further comprises attaching the medial divider to the intermediate frame member using the hook-and-loop textile fastener flap.

* * * * *